United States Patent [19]

Sugita

[11] Patent Number: 5,506,994
[45] Date of Patent: Apr. 9, 1996

[54] MULTIPROCESSOR-TYPE ONE-CHIP MICROCOMPUTER WITH DUAL-MODE FUNCTIONAL TERMINALS

[75] Inventor: Mitsuru Sugita, Hyogo, Japan

[73] Assignee: Mitsubishi Denki Kabushiki Kaisha, Tokyo, Japan

[21] Appl. No.: 49,720

[22] Filed: Apr. 20, 1993

[30]  Foreign Application Priority Data

May 28, 1992 [JP] Japan ..................... 4-161960

[51] Int. Cl.⁶ ............................ G06F 13/00; G06F 15/16
[52] U.S. Cl. .......................... 395/800; 395/375; 364/229;
    364/229.2; 364/232.8; 364/232.9; 364/240.1;
    364/240.7; 364/DIG. 1; 364/940.2; 364/DIG. 2
[58] Field of Search ...................... 395/800, 325,
    395/425, 575, 375, 725, 200, 500; 364/DIG. 1,
    DIG. 2; 365/189.01–189.03

[56]  References Cited

U.S. PATENT DOCUMENTS

| | | | |
|---|---|---|---|
| 4,670,838 | 6/1987 | Kawata | 395/375 |
| 4,908,795 | 3/1990 | Tsuchiya et al. | 365/189.01 |
| 4,969,087 | 11/1990 | Tanagawa et al. | 395/800 |
| 5,021,996 | 6/1991 | Watanabe | 395/800 |
| 5,088,023 | 2/1992 | Nakamura | 395/425 |
| 5,101,498 | 3/1992 | Ehlig et al. | 395/800 |
| 5,262,990 | 11/1993 | Mills et al. | 365/189.02 |
| 5,297,260 | 3/1994 | Kametani | 395/325 |

*Primary Examiner*—Meng-Ai An
*Attorney, Agent, or Firm*—Townsend and Townsend and Crew

[57]  ABSTRACT

A multiprocessor-type one-chip microcomputer, of the type having a plurality of processors, each having a separate address space, a plurality of programmable ROMs, for storing program data for each processor, and a set of functional terminals, with the microcomputer including a common writing bus and a control means for coupling either the common writing bus or a set of functional lines to the functional terminals based on the setting of a mode setting signal. During normal operations the functional lines are coupled to the functional terminals and each programmable ROM is accessed by a processor using addresses in the address space of the processor. When new instruction data is to be written to the programmable ROMs, the common writing bus is coupled to the functional terminals and instruction data is written to the programmable ROMs using addresses in a common address space.

12 Claims, 7 Drawing Sheets

MEMORY MAP FOR NORMAL USE

MEMORY MAP FOR PROGRAM WRITING

MULTIPROCESSOR-TYPE ONE-CHIP MICROCOMPUTER WITH DUAL-MODE FUNCTIONAL TERMINALS

BACKGROUND OF THE INVENTION

1. Field of the Invention

The present invention relates to a multiprocessor-type one-chip microcomputer storing a plurality of processors and a plurality of ROMs connected to a system bus provided for each processor and arranged in separate memory spaces.

2. Description of the Prior Art

FIG. 6 shows a system block diagram of a general multiprocessor. In FIG. 6, symbol 1 is a first CPU (A), 2 is a RAM (A) corresponding to the first CPU (A) 1, 10 is a ROM (A) corresponding to the first CPU (A) 1, and 4 is a system bus (A) for connecting the first CPU (A) 1, RAM (A) 2, and ROM (A) 10. Symbol 5 is a second CPU (B), 6 is a RAM (B) corresponding to the second CPU (B), 11 is a ROM (B) corresponding to the second CPU (B) 5, and 8 is a system bus (B) for connecting the second CPU (B) 5, RAM (B) 6, and ROM (B) 11. A first system comprises the CPU (A) 1, RAM (A) 2, ROM (A) 10, and system bus A) 4, and a second system comprises the CPU (B) 5, RAN (B) 6, ROM (B) 11, and system bus (B) 8.

The following is the description of operations of the multiprocessor.

The CPU (A) 1 reads a program from the ROM (A) 10 to execute processing, which uses the RAM (A) 2 as a working space for temporarily storing data during processing as necessary. Also, the CPU (B) 5 uses the ROM (B) 11 and RAM (B) 6 to execute processing. Moreover, information is transferred between both processings by communication means 9 as necessary. The communication means 9 is generally realized with a shared memory (e.g. dual port RAM) and a serial interface.

Therefore, because two types of processings are executed simultaneously, advantages are produced that the processing speed can be improved and a program can be developed through functional sharing.

As shown in FIG. 6, a multiprocessor-type one-chip microcomputer made by forming two systems on one chip has been used in recent years. However, a mask ROM is frequently used as a stored ROM because it is difficult to use a programmable ROM (hereafter referred to as PROM) for the stored ROM because the number of writing terminals increases. That is, when the PROM is used as the stored ROM, several tens of terminals are newly required as the terminals for two PROM writing buses (including address and data buses). However, the above constitution is very difficult for practical use because a multiprocessor-type one-chip microcomputer originally has many terminals. Therefore, the mask ROM is used for the stored ROM. In this case, to develop a program, it is necessary to form the system bus (A) 4 and system bus (B) 8 outside the chip in order to connect a PROM in which a program is written because a program before debugging is written in the PROM by using a .FROM writer to perform an operation test using an actual microcomputer. These terminals are unnecessary for normal use, that is, when only the stored ROM is used. Therefore, it is necessary to prepare an evaluation chip for program development. Concretely, as shown in FIG. 7, an evaluation chip is prepared on which additional terminals 4a and 8a for forming the external system bus (A) 4 and external system bus (B) 8 are provided and PROMs 10a and 11a in which a program is written are connected to the additional terminals 4a and 8a to repeat the test and debugging.

Because the existing multiprocessor-type one-chip microcomputer is constituted as shown above, It is necessary to separately develop a special chip for program development. Moreover, the special chip for program development has problems that many additional terminals are necessary, the shape of the chip is frequently different from that of an IC normally used, and the burden for a user to use the special chip for program development increases.

SUMMARY OF THE INVENTION

The present invention is made to solve the above problems and its object is to provide a multiprocessor-type one-chip microcomputer not requiring a special chip for program development and decreasing the burden for a user to develop a program.

Therefore, the multiprocessor-type one-chip microcomputer according to a first aspect of the invention is provided with control means for arranging each programmable ROM in the same memory space by constituting each stored ROM with a programmable ROM and connecting each programmable ROM to any functional terminal of the microcomputer through a common writing bus when a program is written in each programmable ROM.

The microcomputer according to a second aspect of the invention, like the above microcomputer, is provided with control means for arranging each programmable ROM in the same memory space by constituting each stored ROM with a programmable ROM, connecting one system bus with a programmable ROM connected to other system bus, and connecting the above one system bus to any functional terminal of the microcomputer when a program is written in each programmable ROM.

The multiprocessor-type one-chip microcomputer having a terminal connected to a specific system bus according to a third aspect of the invention, like the above microcomputer, is provided with control means for arranging each programmable ROM in the same memory space by constituting each ROM with a programmable ROM and connecting the specific system bus connected with the terminal to a programmable ROM connected to a system bus connected with other system bus when a program is written in each programmable ROM.

The microcomputer according to the first aspect of the invention decreases the number of necessary terminals by constituting each stored ROM with a programmable ROM in order to equalize a chip for program development with a chip for practical use and arranging each programmable ROM in the same memory space when a program is written in each programmable ROM. That is, though each programmable ROM is arranged in separate memory space when it is practically used in order to correspond to each system, it is arranged in the same memory space when a program is written. Therefore, terminals for address bus and data bus necessary for writing a a program are shared, and thereby the number of necessary terminals can be decreased and the original functional terminal used for various controls for practical use can be used as a terminal for a program writing bus.

The microcomputer according to the second aspect of the invention has the same function as the above microcomputer and requires no program writing bus or changeover switch for a programmable ROM connected to one system bus. Therefore, the chip size can be decreased.

The microcomputer according to the third aspect of the invention has the same function as the above microcomputer and requires no bus or changeover switch by using a system bus if it appears as a terminal. Therefore, the chip size can be further decreased.

The above and other objects, features, and advantages of the invention will become more apparent from the following description when taken in conjunction with the accompanying drawings.

DESCRIPTION OF THE PREFERRED EMBODIMENTS

Embodiment 1

Embodiment 1 according to the present invention is described below by referring to drawings.

Figure 1:
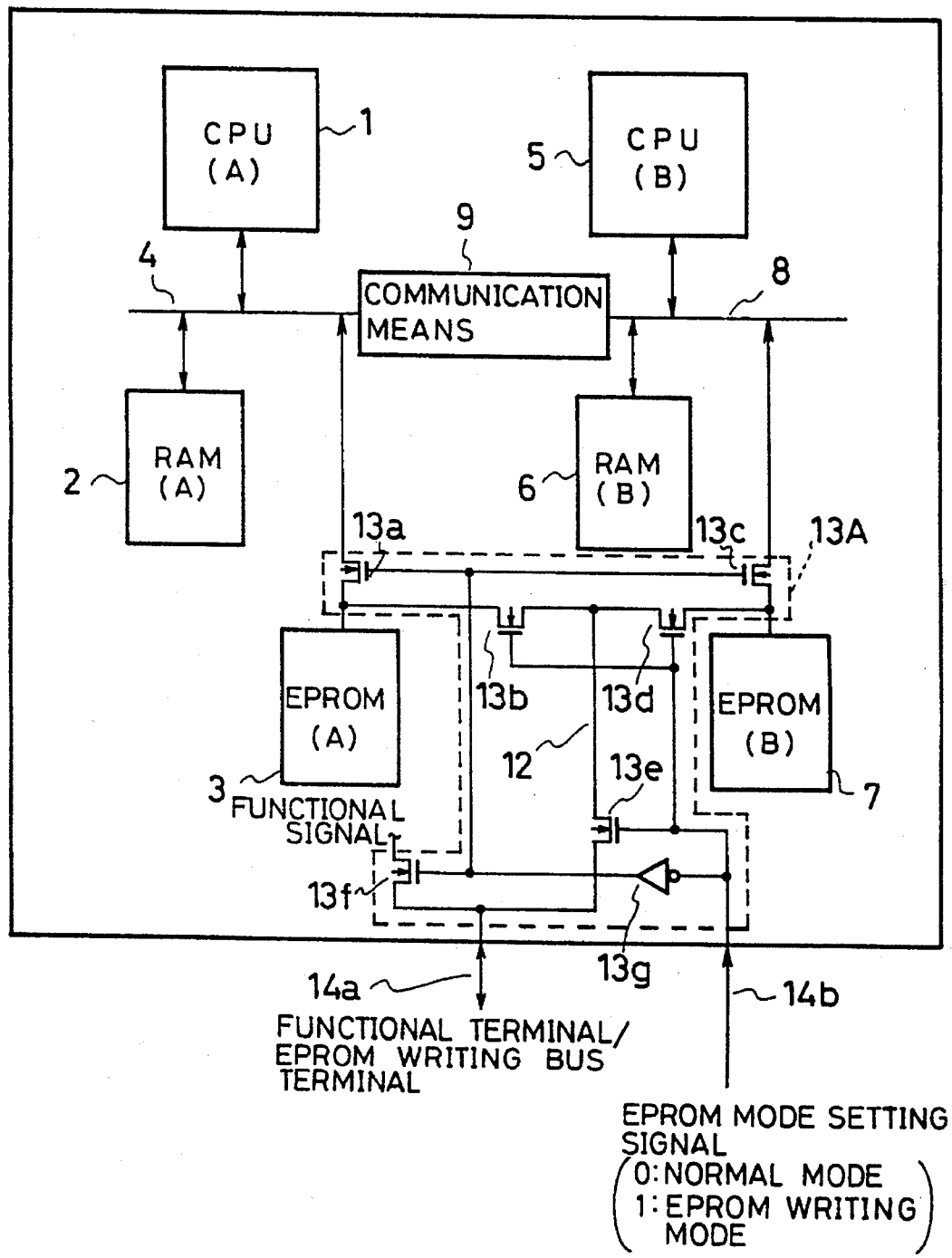
FIG. 1 shows a block diagram of the important section of an embodiment of the present invention.

FIG. 1 shows a block diagram of the important section of the multiprocessor-type one-chip microcomputer according to the present invention, in which the same symbols with those of the embodiment according to the prior art show the same or equivalent portions. Therefore, the description of them is omitted. In FIG. 1, symbol 3 is an ultraviolet-erasable EPROM (A) corresponding to the CPU (A) 1, 7 is an EPROM (B) corresponding to the CPU (B) 5, and 12 is an EPROM writing bus including address and data buses corresponding to the EPROM (A) 3 and EPROM (B) 7 and used for writing a program. The EPROM (A) 3 is connected to the corresponding system bus (A) 4 through an N-channel transistor 13a and to the EPROM writing bus 12 through an N-channel transistor 13b. The EPROM (B) 7 is connected to the corresponding system bus (B) 8 through an N-channel transistor 13c and to the EPROM writing bus 12 through an N-channel transistor 13d. The EPROM writing bus 12 is connected to a plurality of functional terminals 14a originally owned by the microcomputer concerned through an N-channel transistor 13e and the functional terminals 14a are connected to their corresponding sections as original functional terminals through an N-channel transistor 13f. The N-channel transistors 13a to 13f are controlled by an EPROM mode setting signal input from outside through a newly-added terminal 14b. The EPROM mode setting signal sets the normal mode when it is "0" and the EPROM writing mode when it is "1". The mode setting signal is given directly to the gates of the N-channel transistors 13b, 13d, and 13e but given to the gates of the N-channel transistors 13a, 13c, and 13f through a NOT gate 13g. Though only one N-channel transistor or the like is shown in FIG. 1, a similar transistor is provided for each signal line corresponding to a single bit such as address or data bus. In this case, the control means 13A of this application is realized by the N-channel transistors 13a to 13f and the NOT gate 13g.

The following is the description of the operations of this embodiment.

For normal use, the EPROM mode setting signal is kept at "0" and shows the normal mode, the N-channel transistors 13a, 13c, and 13f are turned on, and the N-channel transistors 13b, 13d, and 13e are turned off. Therefore, the EPROM (A) 3 and EPROM (B) 7 are connected to the system bus (A) 4 and system bus (B) 8 by the N-channel transistors 13a and 13c. The functional terminal 14a is connected to the original functional signal line by the N-channel transistor 13f. Therefore, this embodiment operates similarly to the embodiment according to the prior art.

Figure 2A:
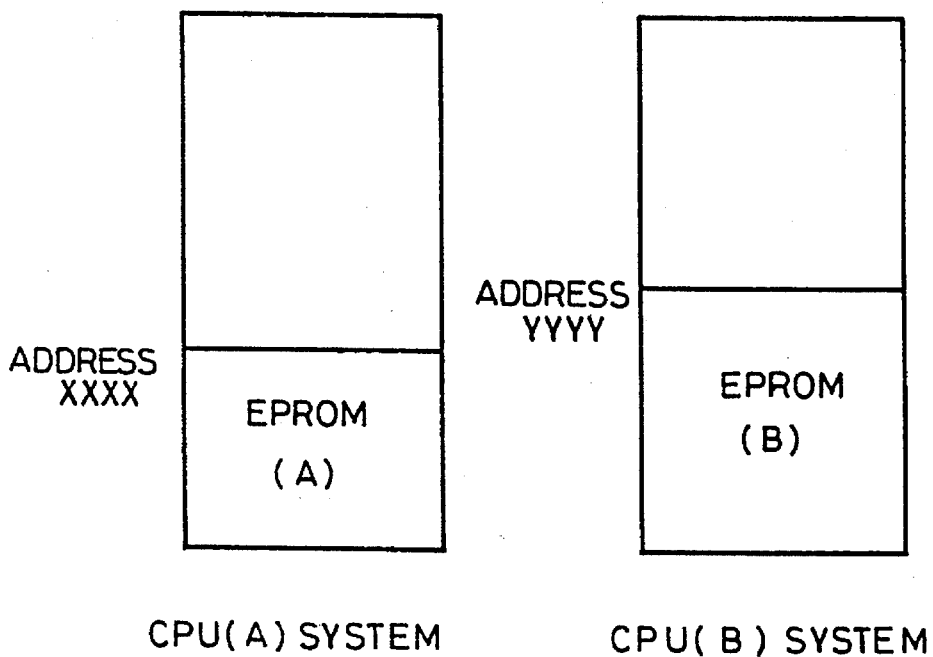
FIGS. 2(a) and 2(b) show a memory maps of the EPROM (Erasable and Programmable Read Only Memory) of the embodiment.
Figure 2B:
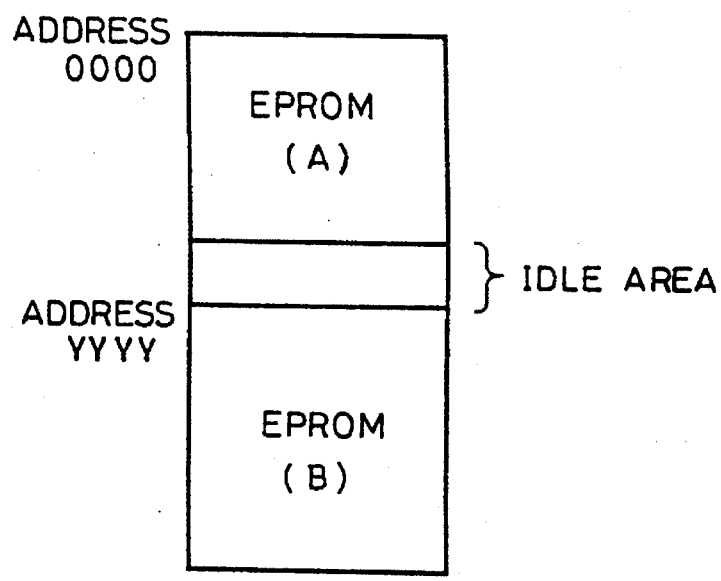

When a program is written in the stored EPROM (A) 3 and EPROM (B) 7, the EPROM (A) 3 and EPROM (B) 7 are connected to the EPROM writing bus 12 by the N-channel transistors 13b and 13d and the EPROM writing bus 12 is connected to the functional terminal 14a by the N-channel transistor 13e by inputting "1" as the EPROM mode setting signal to set the EPROM writing mode, turning off the N-channel transistors 13a, 13c, and 13f, and turning on the N-channel transistors 13b, 13d, and 13e. Therefore, the program can be written from the functional terminal 14a. The EPROM writing bus 12 and functional terminal 14a are shared by each EPROM in order to decrease the number of terminals necessary for EPROM writing. Therefore, the memory map shown in FIGS. 2(a) and 2(b) are prepared to select each EPROM. That is, the program can be written in each EPROM with the common writing bus by changing each EPROM serving as a separate memory space for normal use as shown in FIG. 2 (A) to the same memory space when the program is written as shown in FIG. 2 (B), for example, by arranging the EPROM (A) at the front side of the memory map and the EPROM (B) at the rear side of the memory map to distinguish the former from the latter.

As described above, for this embodiment, the functional terminal originally owned by the microcomputer concerned is combined with the EPROM writing bus. Therefore, it serve as the original functional terminal for normal use and as the EPROM writing bus terminal for EPROM writing by changing them with the EPROM mode setting signal. Thereby, no additional EPROM writing bus terminal is necessary and the number of terminals can be decreased. Therefore, it is possible to minimize the number of terminals for normal use and to use the same chip from the program-development phase to the production phase. That is, a special chip for program development is unnecessary. Thus, the burden for a user to develop a program is greatly decreased.

Embodiment 2

Figure 3:
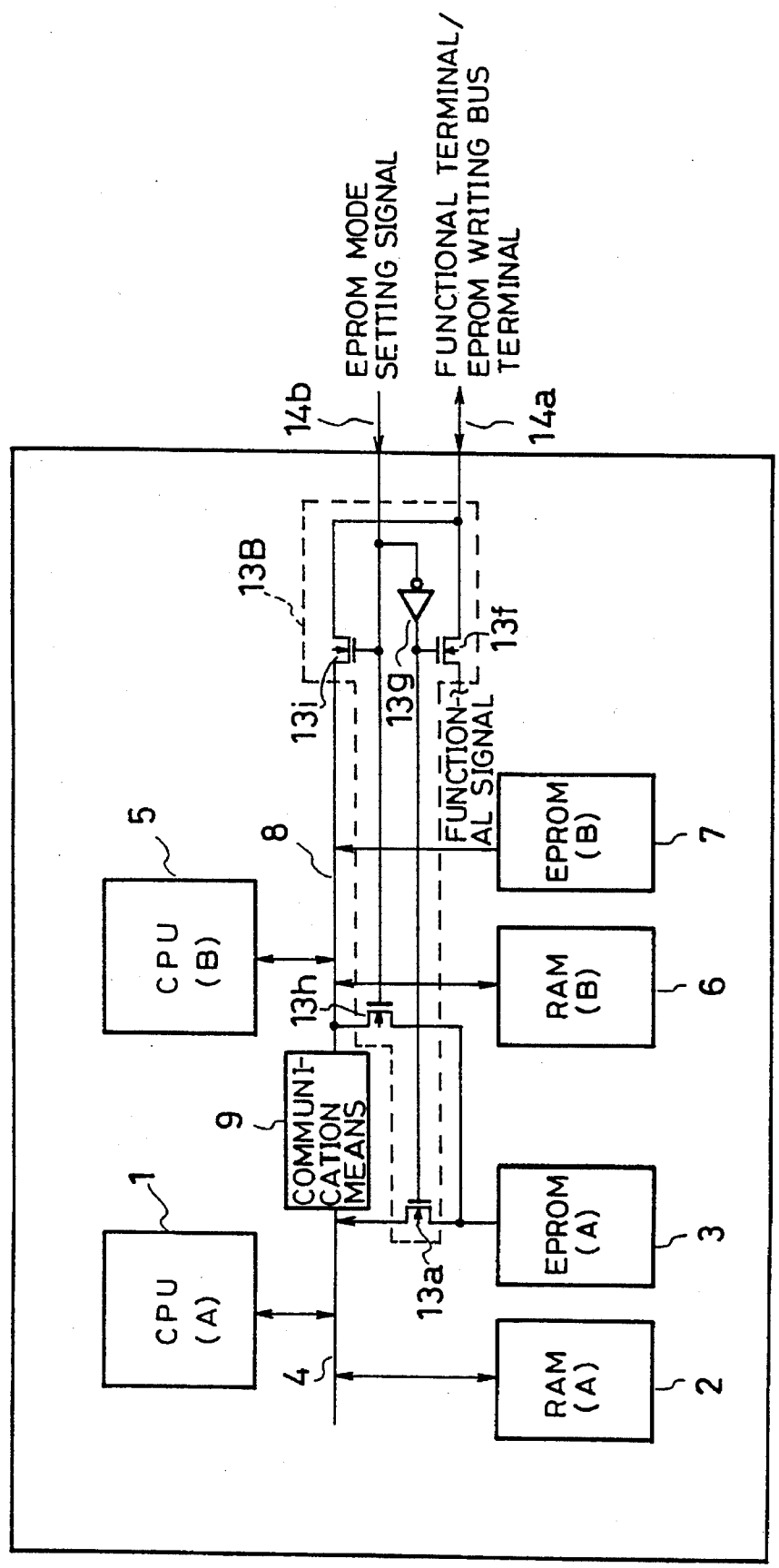
FIG. 3 shows a block diagram of the important section of another embodiment of the present invention.

Though an exclusive common bus for EPROM writing is used for Embodiment 1, it is also possible to share the system bus for normal use as shown in FIG. 3. FIG. 3 shows a case in which the system bus (B) 8 is shared as an EPROM writing bus. For this embodiment, similarly to Embodiment 1, the EPROM (A) 3 is connected to the corresponding system bus (A) 4 through the N-channel transistor 13a and also connected to the other-side system bus (B) 8 through an N-channel transistor 13h. The system bus (B) 8 is connected to a plurality of functional terminals 14a originally owned by the microcomputer concerned through an N-channel transistor 13*i* and the functional terminals 14*a* are connected to their corresponding sections as original functional terminals through the N-channel transistor 13*f*. Similarly to Embodiment 1, the EPROM mode setting signal sets the normal mode when it is "0" and to the EPROM writing mode when it is "1". The mode setting signal given directly to the gates of the N-channel transistors 13*h* and 13*i* but given to the gates of the N-channel transistors 13*a* and 13*f* through the NOT gate 13*g*. In this case, the control means 13B of this application is realized by the N-channel transistors 13*a*, 13*f*, 13*h*, and 13*i*, and the NOT gate 13*g*.

For this embodiment, the writing bus for address and data to be supplied to the EPROM (B) 7 is shared with the system bus 8 for normal use. Therefore, this embodiment has the same function and advantage as Embodiment 1 and requires no writing bus such as address or data bus and no changeover switch for N-channel transistors. Therefore, the chip size can be decreased.

Embodiment 3

Figure 4:
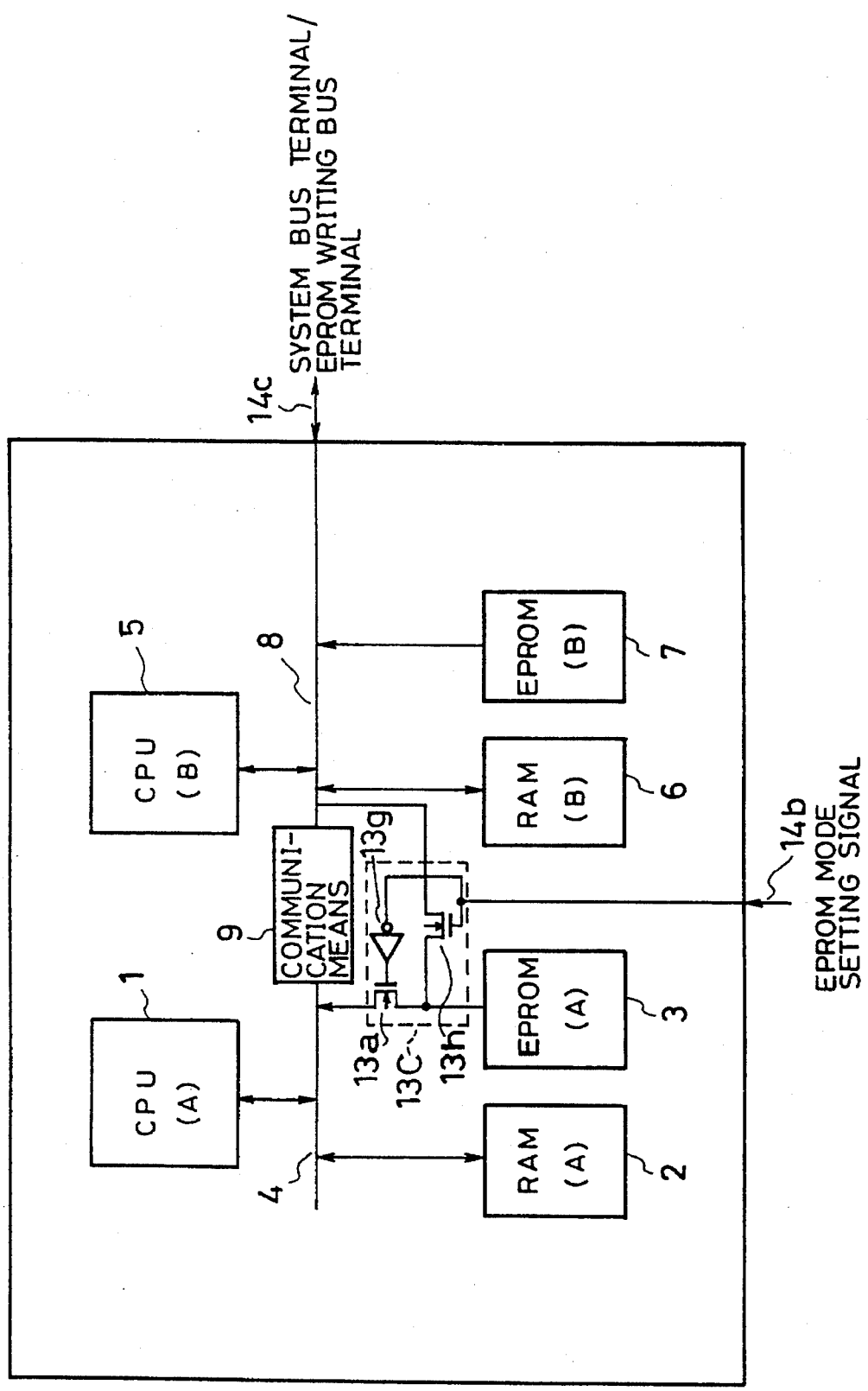
FIG. 4 shows a block diagram of the important section of still another embodiment of the present invention.

FIG. 4 shows a block diagram of the important section of still another embodiment of the present invention. The present invention is applied to a case in which a system bus for normal use appears outside as a terminal. The system bus and terminal are used for EPROM writing. FIG. 4 shows a case in which the system bus (B) 8 and its terminal 14*c* are used as EPROM writing bus and terminal in common. Similarly to Embodiment 2, the EPROM (A) 3 is connected to the corresponding system bus (A) 4 through the N-channel transistor 12*a* and also to the other-side system bus (B) 8 through the N-channel transistor 13*h*. The EPROM mode setting signal also sets the normal mode when it is "0" and the EPROM writing mode when it is "1". The mode setting signal given directly to the gate of the N-channel transistor 13*h* but given to the gate of the N-channel transistor 13*a* through the NOT gate 13*g*. In this case, the control means 13C of this application is realized by the N-channel transistors 13*a* and 13*h* and the NOT gate 13*g*.

This embodiment has the same function and advantage as Embodiment 2 by using the system bus for normal use when it appears as a terminal and requires no changeover switch for the bus and terminal. Therefore, the chip size can be further decreased.

Figure 5:
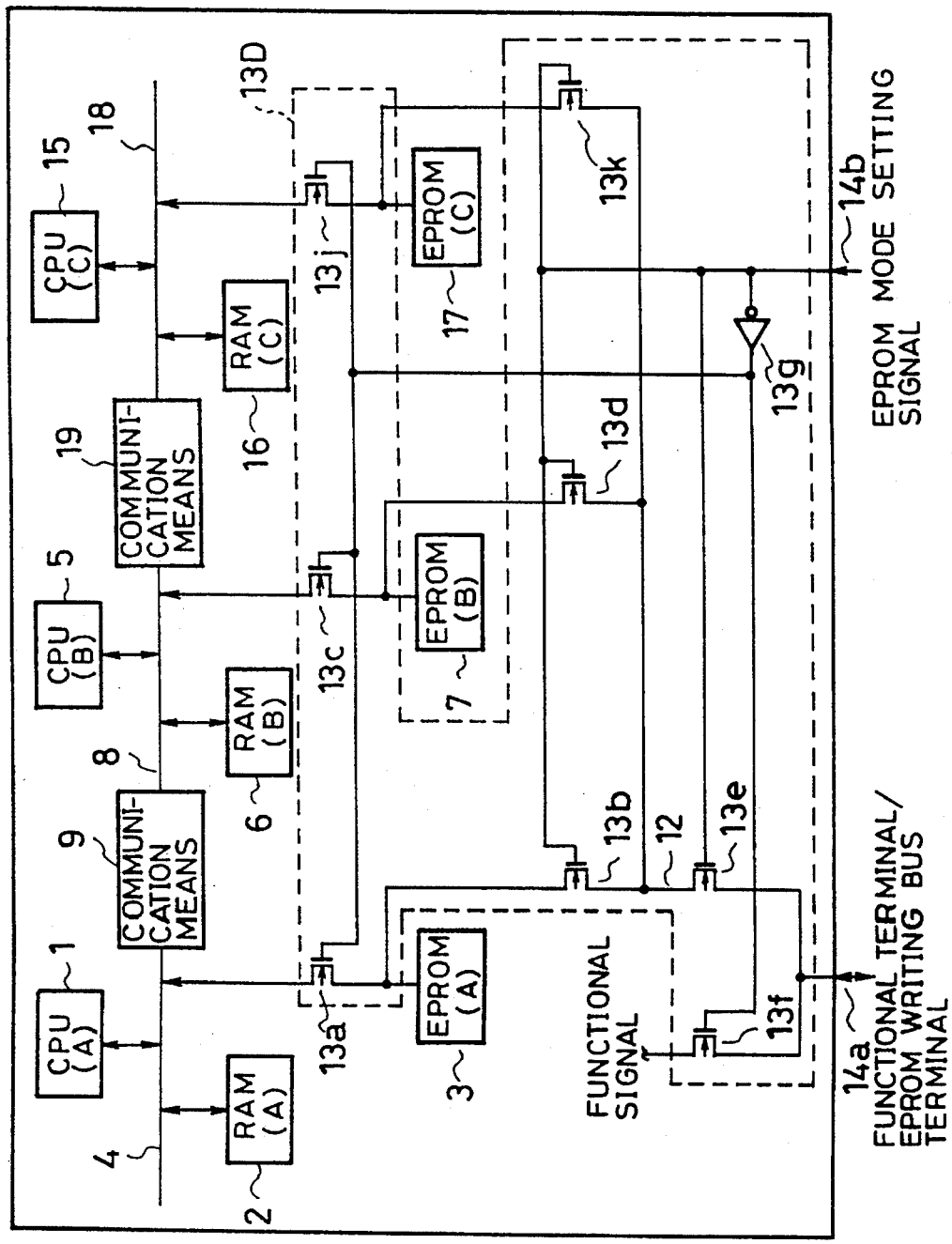
FIG. 5 shows a block diagram of the embodiment in FIG. 1 when using three CPUs.
Figure 6:
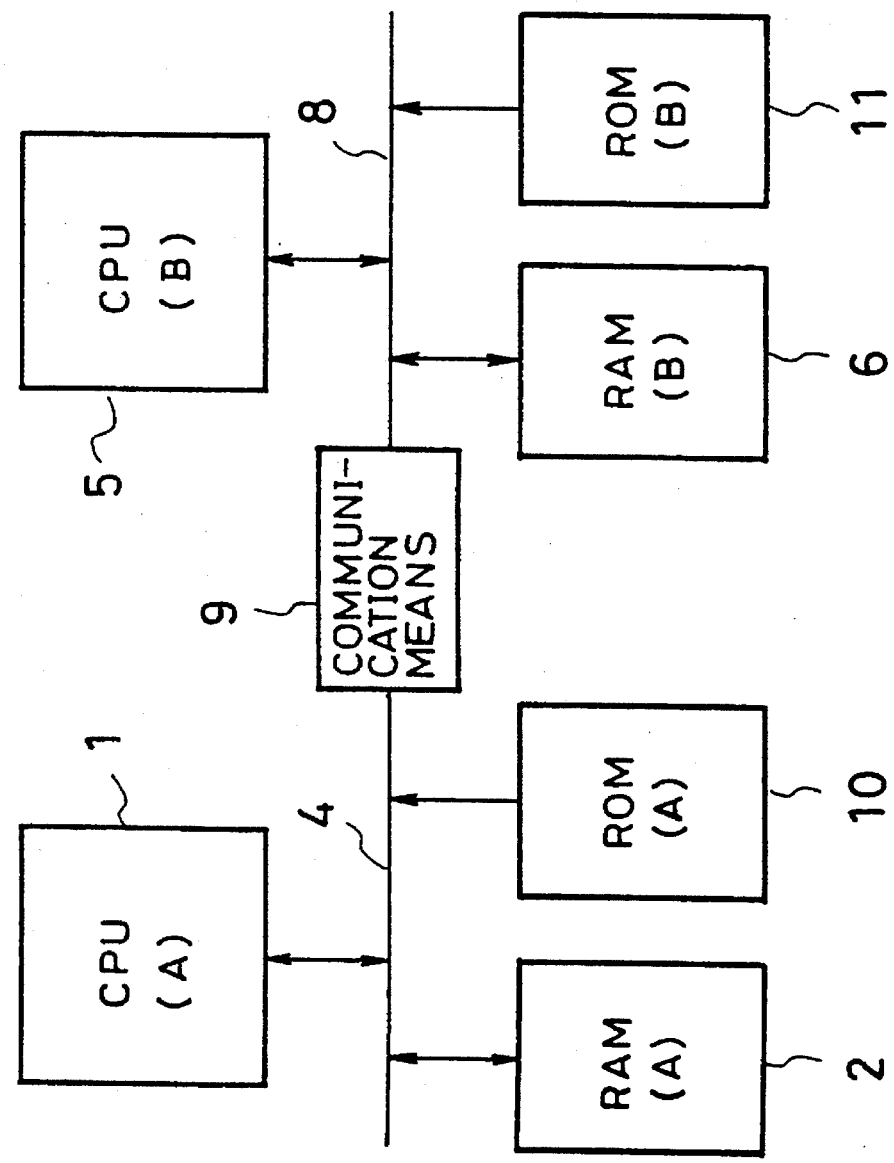
FIG. 6 shows a block diagram of the important section of an embodiment according to the prior art.
Figure 7:
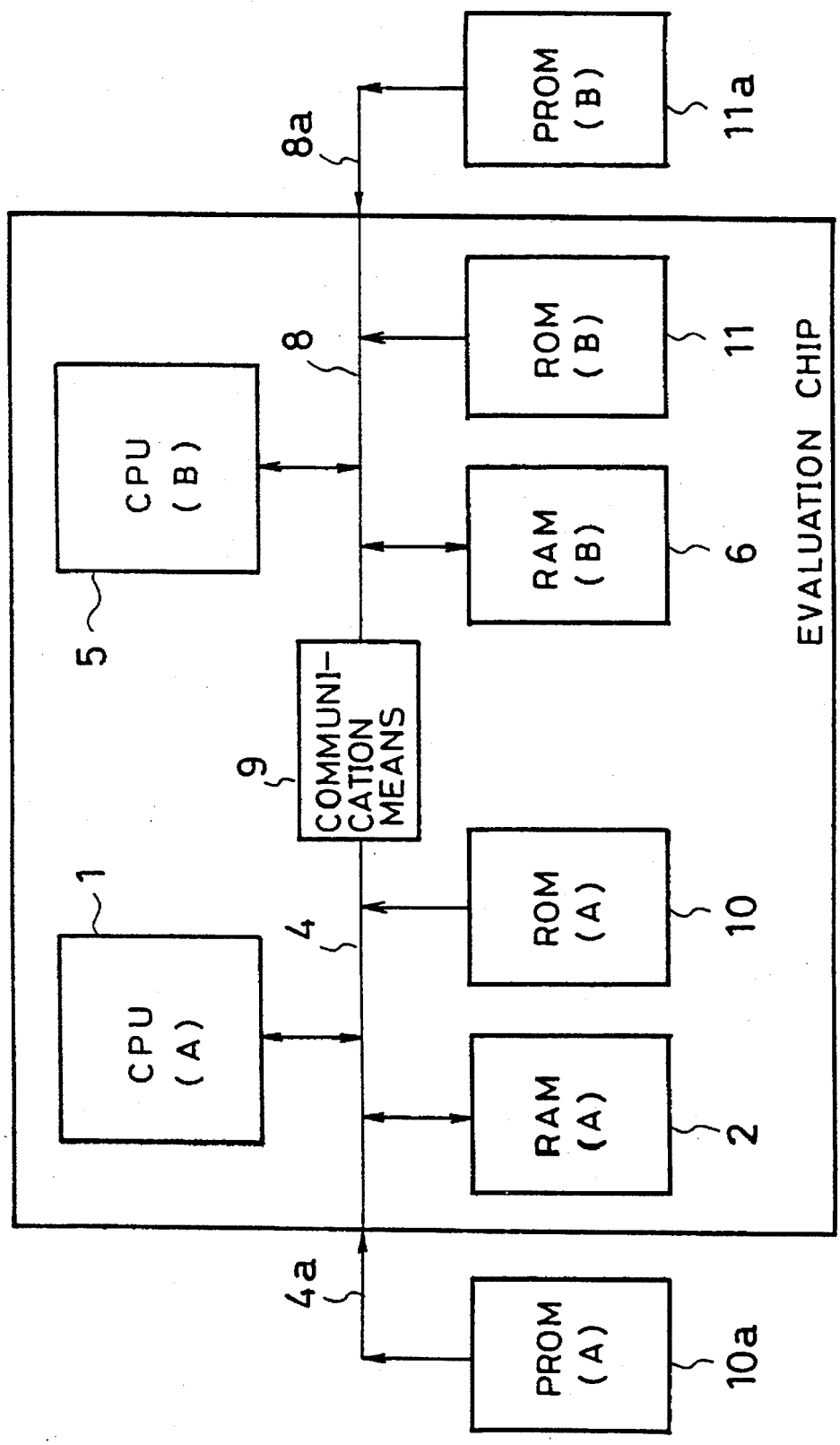
FIG. 7 shows the connection between the evaluation chip and PROM of an embodiment according to the prior art.

For the above embodiments, the control means 13A to 13C are realized by N-channel transistors and NOT gate. However, it is also possible to realize the same function by using P-channel transistors, tristate buffers, and various types of logic circuits. Though a ultraviolet-erasable-type EPROM is used as the programmable ROM for this embodiment, it is also possible to use an OTPROM (One Time Programmable Read Only Memory) in which data can be written once but cannot be erased or an EEPROM (Electric Erasable and Programmable Read Only Memory) whose data is electrically reloadable. Though two CPUs are used for this embodiment, it is possible to realize a multiprocessor-type one-chip microcomputer using three CPUs or more. FIG. 5 shows a constitution using 3 CPUs for Embodiment 1 in FIG. 1. As shown in FIG. 5, a RAM (C) 16, EPROM (C) 17, system bus (C) 18, and communication means 19 are similarly set correspondingly to the third CPU (C) 15. The EPROM (C) 17 is similarly connected to the corresponding system bus (C) 18 through an N-channel transistor 13*j* and also to the EPROM writing bus 12 through an N-channel transistor 13*k*. The EPROM mode setting signal is given directly to the gate of the N-channel transistor 13*k* but given to the gate of the N-channel transistor 13*j* through the NOT gate 13*g*. The control means 13D is constituted with the N-channel transistors 13*a* to 13*f* and 13*j* and 13*k* and the NOT gate 13*g*, which has the same function and advantage as Embodiment 1. The control means 13D can be also applied to Embodiment 2 in FIG. 3 and Embodiment 3 in FIG. 4.

As described above, the multiprocessor-type one-chip microcomputer of the first embodiment is provided with control means for arranging each programmable ROM in the same memory space by constituting each stored ROM with a programmable ROM and connecting each programmable ROM to any functional terminal of the microcomputer through a common writing bus when a program is written in each programmable ROM. Therefore, no program writing bus terminal is necessary. Moreover, because the number of terminals can be decreased, it is possible to minimize the number of terminals for normal use and use the same chip from the program development stage to the production stage. Further more, because no special chip for program development is necessary and a programmable ROM can be easily used, the program development efficiency is improved.

The second embodiment is provided with control means for arranging each programmable ROM in the same memory space by connecting one system bus with a programmable ROM connected to other system bus and the one system bus to any functional terminal of the microcomputer concerned when a program is written in each programmable ROM. Therefore, the same advantage as the above is obtained and no program writing bus or changeover switch is unnecessary for the programmable ROM connected to one system bus. Thus, the chip size can be decreased.

The multiprocessor-type one-chip microcomputer having a terminal connected to a specific system bus according to the third embodiment is provided with control means for arranging each programmable ROM in the same memory space by connecting the specific system bus connected with the terminal to a programmable ROM connected with other system bus when a program is written in each programmable ROM. Therefore, the same advantage as the above is obtained and no changeover switch for the bus and terminal is necessary. Thus, the chip size can be further decreased.

What is claimed is:

1. A multiprocessor-type one-chip microcomputer having a set of functional terminals for inputting and outputting signals carried on a set of functional signal lines or a common writing bus, said microcomputer comprising:

a plurality of programmable ROMs, each of said programmable ROMs having a data/address I/O port and storage locations, accessed by a group of addresses, for storing instructions to be executed by a processor;

a plurality of processors, each processor having a separate memory space including a designated set of addresses for accessing an associated programmable ROM in said plurality of programmable ROMs;

a plurality of system buses, with each of said system buses coupling each of said plurality of processors to said associated programmable ROM;

said common writing bus for transferring a program, input from outside, to be written to said programmable ROMs;

control means, coupled to the I/O ports of said plurality of programmable ROMs, to the set of functional terminals, to said common writing bus, and to said set of functional signal lines, based on a mode setting signal input from outside and coupled to said control means for connecting the data/address I/O port of each of said programmable ROMs in said plurality of programmable ROMs to the set of functional terminals of the microcomputer through said common writing bus when the mode setting signal is set to write a program in each of said programmable ROMs, with each set of addresses for the plurality of programmable ROMs arranged in a common address space of said programmable ROMs so that each of said programmable ROMs can be programmed through the common writing bus and for coupling the set of functional signal lines to the set of functional terminals and coupling the I/O port of each one of said programmable ROMs to each of said system buses when the mode setting signal is reset.

2. A multiprocessor-type one-chip microcomputer according to claim 1, wherein an ultraviolet-erasable EPROM is used as a programmable ROM.

3. A multiprocessor-type one-chip microcomputer according to claim 1, wherein a PROM in which data can be written only once but it cannot be erased is used as a programmable ROM.

4. A multiprocessor-type one-chip microcomputer according to claim 1, wherein an EEPROM whose data is electrically reloadable is used as a programmable ROM.

5. A multiprocessor-type one-chip microcomputer having a set of functional terminals for inputting and outputting signals carried on a set of functional signal lines or a common writing bus, said microcomputer comprising:

a plurality of programmable ROMs, each of said programmable ROMs having a data/address I/O port and storage locations, accessed by a group of addresses, for storing instructions to be executed by a processor;

a plurality of processors, each processor having a separate memory space including a designated set of addresses for accessing an associated programmable ROM in said plurality of programmable ROMs;

a plurality of system buses, with each of said system buses coupling each of said plurality of processors to said associated programmable ROM;

control means, coupled to the I/O ports of said plurality of programmable ROMs, to the set of functional terminals, based on a mode setting signal input from outside and coupled to said control means, for connecting a first system bus included in said plurality of system buses with the set of functional terminals of the microcomputer and connecting the first system bus to the data/address I/O port of each of said programmable ROMs in said plurality of programmable ROMs when the mode setting signal is set to write a program in each of said programmable ROMs, with each set of addresses for the plurality of programmable ROMs arranged in a common address space of said programmable ROMs, so that each of said programmable ROMs can be programmed through the first system bus, and for coupling said set of functional signal lines to the set of functional terminals and coupling the I/O port of each of said programmable ROMS each of said system buses in said plurality of system buses when the mode setting signal is reset.

6. A multiprocessor-type one-chip microcomputer according to claim 5, wherein an ultraviolet-erasable EPROM is used as a programmable 7. A multiprocessor-type one-chip microcomputer according to claim 5, wherein a PROM in which data can be written only once but it cannot be erased is used as a programmable ROM.

8. A multiprocessor-type one-chip microcomputer according to claim 5, wherein an EEPROM whose data is electrically reloadable is used as a programmable ROM.

9. A multiprocessor-type one-chip microcomputer having a set of of functional terminals for inputting and outputting signals carried on a set of functional signal lines or a common writing bus, said microcomputer comprising:

a plurality of programmable ROMs, each of said programmable ROMs having a data/address I/O port and storage locations, accessed by a group of addresses, for storing instructions to be executed by a processor;

a plurality of processors, each processor having a separate memory space including a designated set of addresses for accessing an associated programmable ROM in said plurality of programmable ROMs;

a plurality of system buses, with each of said system buses coupling each of said processors to said associated programmable ROM;

a set of bus I/O terminals connected to a first system bus included in said plurality of system buses;

control means, coupled to the I/O ports of said plurality of programmable ROMs, to the set of functional terminals based on a mode setting signal coupled from outside and coupled to said control means, for connecting a first system bus included in said plurality of system buses to said set of bus I/O terminals to the I/O terminal of each of the programmable ROMs of programmable ROMs when the mode setting signal is set to write a program in each of said programmable ROMs in said plurality, with each set of addresses for the plurality of programmable ROMs arranged in a common address space so that each of said programmable ROMs can be programmed through the first system bus and for disconnecting each of said programmable ROMs but one of said programmable ROMs in said plurality of programmable ROMs from said first system bus when said mode setting signal is reset.

10. A multiprocessor-type one-chip microcomputer according to claim 9, wherein an ultraviolet-erasable EPROM is used as a programmable ROM.

11. A multiprocessor-type one-chip microcomputer according to claim 9, wherein a PROM in which data can be written only once but it cannot be erased is used as a programmable ROM.

12. A multiprocessor-type one-chip microcomputer according to claim 9, wherein an EEPROM whose data is electrically reloadable is used as a programmable ROM.

* * * * *